United States Patent [19]

Feilchenfeld

[11] 4,073,875

[45] Feb. 14, 1978

[54] OXIDATION OF MAGNESIUM CHLORIDE

[75] Inventor: Max Hans Feilchenfeld, Jerusalem, Israel

[73] Assignees: Yissum Research Development Co. of the Hebrew Univ., Jerusalem; Israel Chemicals Ltd., Tel-Aviv, both of Israel

[21] Appl. No.: 697,540

[22] Filed: June 18, 1976

[30] Foreign Application Priority Data

July 4, 1975  Israel .................................... 47643

[51] Int. Cl.$^2$ .......................... C01B 7/03; C01F 5/02
[52] U.S. Cl. ................................... 423/504; 423/636
[58] Field of Search ............... 423/500, 504, 505, 635, 423/636, 638, 498, 659 A

[56] References Cited

U.S. PATENT DOCUMENTS

| 292,742 | 7/1943 | Beck et al. | 423/659 A |
|---|---|---|---|
| 393,258 | 7/1943 | Beck et al. | 423/659 A |
| 2,413,292 | 12/1946 | Christensen | 423/504 X |
| 3,067,006 | 12/1962 | Ebert et al. | 423/659 A X |
| 3,516,785 | 6/1970 | Smith | 423/498 X |
| 3,607,017 | 9/1971 | Lloyd | 423/498 |
| 3,953,574 | 4/1976 | Toomey | 423/498 X |

FOREIGN PATENT DOCUMENTS

| 554,139 | 6/1943 | United Kingdom | 423/504 |
| 11,821 of | 1887 | United Kingdom | 423/504 |

OTHER PUBLICATIONS

Hackh's Chemical Dictionary, 4th Ed., 1969, by Julius Grant, pp. 401 and 402. McGraw-Hill Book Co., N.Y.

*Primary Examiner*—Edward Stern
*Attorney, Agent, or Firm*—John S. Roberts, Jr.

[57] ABSTRACT

The present invention relates to the production of chlorine and magnesium oxide. According to the process substantially anhydrous magnesium chloride, containing at least 95% $MgCl_2$, is admixed with particulate magnesium oxide and contacted with gas comprising oxygen at a temperature from about 700° C to about 1100° C. One of the advantages of the process according to the present invention is to utilize the exothermicity of the oxidation of the molten magnesium chloride, the reaction being self-sustained. According to a preferred embodiment, the particulate magnesium oxide is preheated at a temperature of above 720° C before it is admixed with the molten magnesium chloride and serves as the heat transfer agent for the subsequent oxidation of the magnesium chloride.

The process may be carried out in a stack reactor or in a fluidized bed reactor. The oxidation is effected with substantially dry, pure oxygen or air.

The magnesium oxide obtained in the oxidation reaction may be recycled to be utilized as a support for the magnesium chloride oxidation.

The process of the present invention can be conducted either batchwise or continuously.

8 Claims, No Drawings

OXIDATION OF MAGNESIUM CHLORIDE

This invention relates to the production of chlorine and magnesium oxide by the oxidation of magnesium chloride with oxygen or oxygen-containing gas at elevated temperatures.

It has long been known that it is possible to oxidize magnesium chloride with oxygen or air at temperatures above 400° C in order to produce chlorine and magnesium oxide. Such processes were used on an industrial scale already in the 19th century and formed the subject of numerous patents (cf., e.g. W. Moldenhauer in Z. Anorg. Allg. Chem. 51 (1906), pp 369–390 and literature cited therein). Those known processes used as starting materials magnesium chloride hexahydrate (bischofite) or concentrated magnesium chloride brines. Thus, for example, chlorine was produced for a certain time in a plant in Salindres by blowing hot air, at about 1000° C, over lumps formed from a mixture of a magnesium chloride brine and magnesium oxide. Solvay later claimed, in German Pat. No. 51,084 (1889), that the presence of magnesium oxide was quite unnecessary.

A major drawback of the aforementioned known processes were the considerable amount of hydrogen chloride produced concomitantly with the chlorine, by the hydrolytical reaction of magnesium chloride with the water which was invariably contained in the starting materials. The formation of hydrogen chloride not only decreases the yield of the chlorine but also when present in substantial amount necessitates additional process steps for separating the two products from each other; it also increases the corrosiveness of the reaction mixture and the gaseous effluent.

Attempts to eliminate the hydrolytical reaction and the concurrent formation of hydrogen chloride by the use of the anhydrous magnesium chloride proved to be unsuccessful from a practical point of view, owing to the very low rate of the oxidation even at the high temperatures of about 1000° C.

It has now surprisingly been found, in accordance with the present invention, that chlorine containing only a relatively small amount of hydrogen chloride, can be produced at industrially feasible rates, by the oxidation of substantially anhydrous magnesium chloride with oxygen or oxygen-containing gas at elevated temperatures, if the magnesium chloride is admixed with particulate magnesium oxide and after heating the molten magnesium chloride is dispersed as a thin film on the magnesium oxide particles.

The invention thus provides, a process for the production of chlorine and magnesium oxide by oxidation of magnesium chloride with oxygen or with an oxygen-containing gas mixture at elevated temperatures, the improvement consisting in admixing substantially anhydrous magnesium chloride (as herein defined) with substantially anhydrous, particulate magnesium oxide and contacting the mixture with a subatantially anhydrous gas comprising oxygen, at a temperature from about 700° to about 1100° C.

One of the important advantages of the process according to the present invention is to utilize the exothermicity of the oxidation of the molten magnesium chloride. Thus, if a mixture of substantially anhydrous magnesium chloride and magnesium oxide which has been preheated to a temperature above about 720° C is introduced into an adiabatic reactor, preheated to a corresponding temperature, the reaction is self-sustaining and there is no need to supply heat to the reactor in addition to the heat transferred by the feed of the foresaid mixture of reactants. By virtue of this important feature, the invention in some preferred embodiments thereof, solves a major technical problem concerning the heating of the reactor. Owing to the already mentioned high corrosivity of the reaction mixture which contains both chlorine and hydrogen chloride, it is difficult and industrially unfeasible to carry out the reaction in metal reactors and use is made of reactors made of or lined with corrosion resistant refractory materials. It is impractical to heat such reactors externally and, on the other hand, internal heating e.g. by burning a gaseous fuel inside the reactor, has the drawback that it dilutes the reactants as well as the gaseous reaction products and introduces undesirable water into the system. Said preferred embodiments of the invention, to be described in further detail hereinbelow, are carried out in a continuous manner in an adiabatic reactor which is fed with preheated anhydrous magnesium chloride and preheated magnesium oxide, either separately or in admixture. In accordance with one such preferred embodiment the reactor is fed, separately, with solid anhydrous magnesium chloride preheated to a temperature above about 450° C but below its melting point, and particulate anhydrous magnesium oxide which has been preheated to a temperature higher than the desired reaction temperature, e.g. between about 750° to 1300° C. The magnesium chloride particles, immediately after they are introduced into the reactor, come in contact with the hot magnesium oxide particles whereupon they melt and become dispersed on the latter particles as a liquid film. In this manner the magnesium oxide serves not only as a support for the magnesium chloride, but also as a heat transfer agent.

Absolutely anhydrous magnesium chloride may be used for the process. In this case after oxidation, according to the process of the present invention, substantially pure chlorine will be produced. However, anhydrous magnesium chloride is a rather costly starting material. We have found that "substantially anhydrous magnesium chloride", which is defined in the context of this invention as magnesium chloride containing at least 95% magnesium chloride and the balance mainly water and some magnesium oxide can be successfully used. In this case the chlorine produced by the process of the invention will be accompanied by small amounts of hydrogen chloride. It is not always necessary to separate these minor amounts of hydrogen chloride, as they are not obnoxious in many industrial uses of chlorine, for instance in substitutive organic chlorination, bleaching, and so on. If desired however, the hydrogen chloride can be removed from the gaseous reaction products by conventional methods, e.g. by washing out the hydrogen chloride. It is also possible to remove the elementary chlorine from the gaseous reaction mixture by conventional means, e.g. by extraction, condensation or chemical reaction.

The magnesium oxide to be used in the process of the invention should be substantially anhydrous and particulate. The average particle size should preferably be between 0.1 and 5 mm. The purity of the magnesium oxide does not appear to be a critical factor and a technical grade of magnesium oxide either reactive, dead burnt or sintered can suitably be used. In particular, the solid reaction product of the process may be recycled and used for this purpose.

The proportion of magnesium oxide to be admixed with the magnesium chloride, in accordance with the invention when carried out in a stack reactor should preferably be from 0.1 to 100 moles, more preferably from 0.3 to 10 moles of magnesium oxide per 1 mole of magnesium chloride. Within these limits of the ratio magnesium oxide to magnesium chloride, it seems that the system is more stable and the reaction according to the present invention can be more easily controlled.

In accordance with the process of the invention, a stream of substantially dry oxygen, or a substantially dry gas mixture containing oxygen, is passed over a mixture of substantially anhydrous magnesium chloride and magnesium oxide, at a temperature between 700° to 1100° C, preferably between 750° and 900° C. It has been found that air can suitably be used in the process, resulting however in some reduction of rate as compared with pure oxygen under identical conditions. The gas stream can advantageously be preheated before coming into contact with the mixture. The effluent gas stream contains chlorine, some hydrogen chloride and unreacted oxygen, and obviously any gases present in the feed gas mixture which have not participated in the reaction. The effluent gases may also contain particles of magnesium oxide in suspension, and these can be separated from the gaseous products in a conventional manner, e.g. by gravity, cyclone, etc. After completion of the reaction the solid product if found to consist of virtually pure magensium oxide.

The process of this invention can be conducted either batchwise or continuously. In the first mentioned alternative, the magnesium chloride and the magnesium oxide may suitably be mixed in the required proportions at ambient temperature and the mixture introduced into a reaction vessel heated, either before or after introduction of the mixture, to the required oxidation temperature. Substantially dry air or a gas stream comprising oxygen is then passed into the reaction vessel over the reactants and the effluent gaseous products are continuously collected as they emerge from the reaction vessel. Chlorine can be separated from the effluent gas by conventional methods, e.g. condensation or absorption, or it can be passed directly for use as required, e.g. in a chemical chlorination reaction.

In accordance with a modification of this batch-type process, a layer of magnesium oxide particles or lumps is first introduced into the reaction vessel and this layer is then topped with a layer of substantially anhydrous magnesium chloride. The reaction vessel is then heated, the magnesium chloride melts and under the force of gravity descends and pervades the magnesium oxide layer so as to become intimately admixed with the magnesium oxide as a thin film on the particles or lumps thereof.

Alternatively the reaction vessel containing the magnesium oxide layer may be heated, before the introduction of the magnesium chloride to the desired reaction temperature, and the substantially anhydrous magnesium chloride applied thereafter, on top of the magnesium oxide layer, either in a preferably preheated solid particulate form or in an already molten state.

In accordance with another embodiment of the invention, the process can be carried out continuously by introducing the substantially anhydrous magnesium chloride and the hot magnesium oxide, either separately or in admixture, into the upper portion of a vertical tower-like reactor lined with a corrosion-proof refractory material, e.g. magnesium oxide. The magnesium chloride (if not already introduced in the molten state as described hereinafter) melts and spreads spontaneously on the surface of the magnesium oxide particles and this intimate mixture forms a moving bed in the reactor through which preheated oxygen or oxygen containing gas is blown counter-currently. The gaseous reaction products emerge through outlets provided near the top of the reactor while the solid product is continuously withdrawn from the bottom by known means, e.g. by a sealed screw conveyor. A part of this magnesium oxide effluent may advantageously be recycled, preferably after being reheated to the desired temperature, to the top of the reactor, or to the premixing stage with the magnesium chloride for its subsequent oxidation.

In the above described embodiment it is possible to introduce into the top of the reactor, at the desired rate, a premixed starting material, i.e. a mixture of the substantially anhydrous magnesium chloride and the magnesium oxide. This mixture can preferably be preheated to the oxidation temperature.

Alternatively, it is possible to introduce the substantially anhydrous chloride and the magnesium oxide separately into the top of the reactor through adjacent inlets, so as to provide for the admixture of these two reaction components inside the reactor, during the first part of their descent. In such a case it is also preferable to preheat each of the two solid reactants before introducing them into the reactor. In accordance with one modification of this procedure, the anhydrous magnesium chloride is melted prior to its introduction into the reactor, and is preferably introduced in the form of a spray of small droplets. These meet in the reactor with the feed stream of magnesium oxide particles, which has also been preferably preheated to an elevated temperature.

A preferred embodiment of the invention already mentioned above uses the magnesium oxide not only as a support for the magnesium chloride, but also as a heat transfer agent utilizing the exothermicity of the oxidation of molten magnesium chloride. In accordance with this embodiment, a refractory-lined vertical reactor of the type described above can be used. The top part of this reactor is fed with substantially anhydrous magnesium chloride, optionally preheated to a temperature between about 450° and its melting temperature, and magnesium oxide which has been preheated to a temperature higher than the desired reaction temperature, e.g. between 750° and 1300° C. The magnesium chloride particles, immediately after they are introduced into the reactor, come in contact with the hot magnesium oxide particles whereupon they melt and become dispersed on the latter particles as a thin liquid film. As mentioned above, it has been found that under these conditions the oxidation reaction is self-sustaining. Prior to the introduction of the magnesium chloride, the reactor may be heated to the desired reaction temperature by circulating there through heated magnesium oxide.

The process of this invention can also be carried out in a fluidized bed reactor. The bed consists of magnesium oxide which particle sizes are governed by the fluidization characteristic, and molten magnesium chloride is introduced at such a rate that the molar ratio of $MgCl_2$ to MgO in the bed is in the range of about 0.01 to 1 mole $MgCl_2$ per 100 moles of MgO. The excess of the volume of magnesium oxide formed by the oxidation is blown out from the reactor. The magnesium chloride content in the bed is therefore held within the limits mentioned above in order not to "wet" the total surface of magnesia, thus contributing to the stability of the system.

The invention is further illustrated by the following non-limiting examples.

EXAMPLE 1

One part by weight of anhydrous magnesium chloride, prepared from "Merck pro-analysis" magnesium chloride hexahydrate, was spread on a layer of two parts by weight of magnesium oxide ("Baker heavy") in a platinum crucible and the mixture was heated at a constant rate of 8° C/min. from room temperature to 800° C in a current of dry oxygen. At about 470° C the reaction started at a rate of decomposition of 0.005 equivalents of chlorine per mole of magnesium chloride per minute. On further heating the reaction continued at about the same rate until melting occured at 716° C whereupon the rate of decomposition jumped to 0.134 equivalents of chlorine per mole of magnesium chloride per minute. The average rate of reaction during the last 15 minutes was 0.1 equivalents of chlorine per mole of magnesium chloride per minute, i.e. all the magnesium chloride was oxidized into chlorine within 20 minutes.

Inspection of a sample obtained by interrupting a similar run at 720° C showed that the magnesium chloride had molten and a major part had impregnated the underlying magnesia layer. A smaller part adhered to the crust formed by the oxidation of the surface of the original crystals of magnesium chloride.

In contrast to the above, if the same amount of the same anhydrous magnesium chloride in an identical platinum crucible was treated in an identical manner, except that the magnesium oxide layer was omitted, the oxidation reaction which started at 475° C was not sustained although heating was continued up to 800° C. After one hour only 23% of the magnesium chloride had decomposed and after 2 hours — only 33%.

EXAMPLE 2

5 gr. of the same magnesium oxide as was used in Example 1, were heated in a quartz reactor to above 900° C in a stream of argon, thereby eliminating substantially all absorbed moisture. The reactor was then cooled to 850° C. 1 gr of anhydrous magnesium chloride was then added through an opening at the reactor top and the contents of the reactor were mixed by applying a vibrator. The argon was then replaced by a stream of oxygen and the exit gases were analyzed. The results are summarized in the following table:

| Time (min.) | Yield of chlorine (%) | Conversion of magnesium chloride (%) | Selectivity $(Cl_2/Cl_2 + 2Cl^-)$ |
|---|---|---|---|
| 1.5 | 4.2 | 5.5 | 0.759 |
| 3.5 | 7.6 | 9.5 | 0.792 |
| 5.5 | 11.1 | 13.4 | 0.831 |
| 8.5 | 15.1 | 17.8 | 0.850 |
| 11.5 | 18.0 | 21.1 | 0.850 |
| 15.5 | 21.6 | 25.3 | 0.855 |
| 20.5 | 25.3 | 29.7 | 0.854 |
| 30.5 | 45.4 | 52.6 | 0.874 |
| 45.5 | 79.3 | 88.7 | 0.895 |
| 65.5 | 80.4 | 90.2 | 0.891 |

The exit gas at the maximum rate of the reaction contained 35.5 mole per cent of elementary chlorine and 5.8 mole per cent of hydrogen chloride, the balance being oxygen.

EXAMPLE 3

15 gr of magnesium oxide which had previously been sintered at around 1700° C and then sieved so as to consist of particles of a size of 0.63 mm to 0.80 mm, were heated in air at a flow rate of 45 ml/min. in an apparatus as described in Example 2. After 1 hour the reactor was allowed to cool to 895° C and was kept at this temperature. 0.6292 gr. of solid anhydrous magnesium chloride was added and the course of the reaction was followed. The results are given below:

| Time (min.) | Yield of chlorine (%) | Conversion of magnesium chloride (%) | Selectivity $(Cl_2/Cl_2 + 2Cl^-)$ |
|---|---|---|---|
| 5 | 15.9 | 18.7 | .850 |
| 10 | 38.4 | 43.1 | .892 |
| 15 | 56.0 | 61.9 | .905 |
| 20 | 65.8 | 72.4 | .909 |
| 30 | 76.4 | 83.6 | .914 |
| 90 | 89.8 | 99.4 | .903 |

EXAMPLE 4

The procedure of Example 3 was followed, except that oxygen was used instead of air and the reaction temperature was 880° C. The results were as follows:

| Time (min.) | Yield of chlorine (%) | Conversion of magnesium chloride (%) | Selectivity $(Cl_2/Cl_2 + 2Cl^-)$ |
|---|---|---|---|
| 2 | 11.7 | 11.9 | .986 |
| 5 | 70.2 | 74.3 | .945 |
| 8 | 87.9 | 92.1 | .955 |
| 11 | 89.8 | 94.0 | .955 |
| 30 | 91.8 | 96.0 | .956 |
| 60 | 92.8 | 97.5 | .952 |

EXAMPLE 5

22 gr. of sintered magnesium oxide of particle size of 0.50 to 0.63 mm were premixed with 0.7944 gr. of solid anhydrous magnesium chloride and the mixture was introduced from the top into a quartz reactor at 850° C. Oxygen was passed through the reaction mixture at a flow rate of 45 ml/min. The analysis of the effluent gave the following results:

| Time (min.) | Yield of chlorine (%) | Conversion of magnesium chloride (5) | Selectivity $(Cl_2/Cl_2 + 2Cl^-)$ |
|---|---|---|---|
| 2 | 1.8 | 4.1 | .427 |
| 5 | 19.6 | 22.9 | .856 |
| 8 | 57.0 | 61.3 | .930 |
| 11 | 78.8 | 83.4 | .945 |
| 20 | 88.1 | 94.1 | .936 |

EXAMPLE 6

A quartz reactor was constructed so that anhydrous magnesium chloride could be melted separately and by tilting the apparatus, poured over a hot bed of magnesium oxide. In this arrangement, both parts were flushed with argon and then heated. The bed of magnesium oxide (20 gr) was kept at about 700° C and the molten anhydrous magnesium chloride at about 800° C. Oxygen was then substituted for argon in the part of the apparatus containing the magnesium oxide and the hot molten anhydrous magnesium chloride was poured over the magnesium oxide. The results are given below:

| Time (min.) | Yield of chlorine (%) | Conversion of magnesium chloride (%) | Selectivity ($Cl_2/Cl_2 + Cl^-$) |
|---|---|---|---|
| 5 | 8.0 | 10.2 | .783 |
| 10 | 40.2 | 43.6 | .922 |
| 20 | 67.8 | 71.9 | .943 |
| 30 | 78.3 | 82.8 | .945 |
| 60 | 87.3 | 92.9 | .939 |

EXAMPLE 7

A reactor as described in Example 2 was filled with 15 g of sintered magnesium oxide of a particle size of 0.63 mm to 0.80 mm and heated to 880° C. Successive portions of about 1 g each of anhydrous magnesium chloride were introduced into the reactor and reacted therein with oxygen, until a total of 30 g of magnesium chloride had been fed. After completion of the reaction the solid product was divided into two parts, one of which comprising 15 g was returned to the reaction vessel and the reaction was continued with fresh 1 g portions of magnesium chloride. The results of the last of these latter runs were as follows:

| Time (min.) | Yield of chlorine (%) | Conversion of magnesium chloride (%) | Selectivity ($Cl_2/Cl_2 + 2Cl^-$) |
|---|---|---|---|
| 2 | 7.4 | 9.4 | .783 |
| 5 | 41.9 | 46.9 | .894 |
| 8 | 70.4 | 77.6 | .908 |
| 60 | 87.9 | 95.9 | .917 |

EXAMPLE 8

Sintered magnesium oxide of a particle size of 0.63 mm to 0.80 mm, was heated in the flame of a Bunsen type gas burner and introduced into the top of a quartz tube. Magnesium oxide was continuously withdrawn from the bottom of the tube and recycled through the flame of the gas burner to the top of the quartz tube. After a certain time, the tube and the contents reached a temperature of approximately 900° C. During and after this stage, oxygen was continuously passed from the bottom towards the top of the quartz tube counter-currently to the magnesium oxide stream. After conditions became stabilized, anhydrous magnesium chloride preheated to about 650° C was added continuously through a port at the top of the quartz tube. Analysis of the effluent gas stream showed that it consisted of 40% by volume of elementary chlorine, 5% by volume of hydrogen chloride, the balance being oxygen.

EXAMPLE 9

An experimental fluid bed reactor was constructed from a thermally insulated tube of "mullite" ($3Al_2O_3 \cdot 2SiO_2$) having an inner diameter of 8 cm. The tube was provided with external electrical heating arrangement, which permitted the initial heating of the reactor to the desired reaction temperature of 850° C and the compensation in the course of the reaction of heat losses due to the small size of the reactor. The reactor was charged with 400 g of particulate magnesium oxide (which had been prepared by oxidation of magnesium chloride) having a particle size between 0.35 mm and 0.8 mm and the magnesium oxide bed was effectively fluidized by a stream of preheated air introduced through a gas distribution plate at the bottom of the reactor, at a rate of 670 cm³/sec. The exit gas was withdrawn through an opening in the top plate of the reactor tube.

The reactor was heated to 850° C, whereupon the heating was stopped and molten magnesium chloride ("British Drug House", technical grade) was fed continuously into the fluidized bed at a rate of 25 g/min. for 30 minutes. The excess of the volume of solid over that at the beginning of the run was then blown out through a tube passing through the top plate of the reactor and the run continued. This procedure was followed for five consecutive times.

Analysis of the solid withdrawn showed the following results:

| Batch | Chloride content (% by weight) |
|---|---|
| 1 | 0.7 |
| 2 | 0.9 |
| 3 | 0.8 |
| 4 | 1.2 |
| 5 | 1.0 |

The conversion of magnesium chloride was above 98%. Analysis of the exit gas gave an average composition (by volume) of 13% chlorine, 12% oxygen, 73% nitrogen and 2% hydrogen chloride. Thus, this process is carried out in a fluidized bed reactor wherein the substantially anhydrous magnesium chloride is continuously fed to a fluidized bed of preheated magnesium oxide and the solid magnesium oxide product is continuously withdrawn from the reactor so as to maintain a substantially constant volume of the fluidized bed.

I claim:

1. In a process for the production of chlorine and magnesium oxide by oxidation of magnesium chloride with a gas comprising oxygen the improvement consisting at elevated temperatures of 750°–900° C in performing an exothermic reaction of magnesium chloride in a molten state in the form of a thin film on a support consisting of substantially anhydrous particulate magnesium oxide, said reaction being carried out with substantially anhydrous gas comprising oxygen.

2. The process according to claim 1 wherein the substantially anhydrous magnesium chloride is heated to a temperature above its melting point and admixed in the molten state with the magnesium oxide.

3. The process according to claim 2 wherein the magnesium oxide is preheated to a temperature above 750° C before it is admixed with the molten magnesium chloride and serves as the heat transfer agent for the oxidation of the magnesium chloride.

4. The process according to claim 3 wherein the admixing is effected by applying the magnesium chloride to the top of a layer of particulate magnesium oxide so as to be dispersed throughout this layer in the molten state by the force of gravity.

5. The process according to claim 4 which is carried out in an adiabatic reactor.

6. The process according to claim 1 wherein the oxidation is effected in the presence of substantially pure, dry oxygen or substantially dry air.

7. The process according to claim 1 which is carried out in a continuous manner.

8. The process according to claim 1 which is carried out in a fluidized bed reactor and wherein the substantially anhydrous magnesium chloride is continuously fed to a fluidized bed of preheated magnesium oxide and the solid magnesium oxide product is continuously withdrawn from the reactor so as to maintain a substantially constant volume of the fluidized bed.

* * * * *